April 10, 1945.　　　　　A. LANDY　　　　　2,373,316
ENDLESS CRAWLER TREAD CYCLE
Filed Oct. 2, 1941　　　　6 Sheets-Sheet 1

Fig. 1.

Inventor
ARNEY LANDY
By Chas. E. Reif
Attorney

April 10, 1945. A. LANDY 2,373,316
ENDLESS CRAWLER TREAD CYCLE
Filed Oct. 2, 1941 6 Sheets-Sheet 4

Fig. 7.

Inventor
ARNEY LANDY
By Chas. E. Reif
Attorney

April 10, 1945.  A. LANDY  2,373,316
ENDLESS CRAWLER TREAD CYCLE
Filed Oct. 2, 1941  6 Sheets-Sheet 5

Inventor
ARNEY LANDY
By Chas. E. Reif
Attorney

April 10, 1945.  A. LANDY  2,373,316
ENDLESS CRAWLER TREAD CYCLE
Filed Oct. 2, 1941  6 Sheets-Sheet 6

Inventor
ARNEY LANDY
By Chas. E. Rey
Attorney

Patented Apr. 10, 1945

2,373,316

UNITED STATES PATENT OFFICE 2,373,316

ENDLESS CRAWLER TREAD CYCLE

Arney Landy, Deer River, Minn.

Application October 2, 1941, Serial No. 413,280

21 Claims. (Cl. 180—9.2)

This invention relates to a vehicle and particularly to a motor driven vehicle of the motorcycle type having endless tracks at each side thereof.

It is an object of this invention to provide a motor driven vehicle of the motorcycle type having a frame, a seat supported above said frame so that the operator may straddle said frame in occupying said seat, pairs of wheels at the front and rear of said vehicle, endless tracks running over said wheels at each side of said frame together with means for steering said vehicle.

It is a further object of the invention to provide such a motor driven vehicle as set forth in the preceding paragraph in which the wheels of each of said pairs converge toward their upper ends, the planes of said treads thus converging toward their upper runs.

It is also an object of the invention to provide a motor driven vehicle such as set forth in the preceding paragraph save one, together with means for operating on said treads to tilt said frame laterally in either direction to maintain said frame substantially in vertical position.

It is still another object of the invention to provide a motor driven vehicle of the motorcycle type having a frame, endless treads at either side of said frame supporting said vehicle and an endless tread between said treads, the bottom of the lower run of said last mentioned tread being disposed above the bottoms of the runs of said first mentioned treads.

It is still further an object of the invention to provide a motor driven vehicle of the motorcycle type having a frame, endless treads at each side of said frame together with means for pressing down on said treads at the central portion thereof respectively to lessen the friction at the end portions of the respective tread to facilitate turning of said vehicle.

It is another object of the invention to provide a motor driven vehicle of the type above mentioned having a frame and endless tracks at each side of said frame together with means for breaking or retarding the movement of the track at one end of said frame to cause turning of said vehicle.

Another object of the invention is to provide a motor driven vehicle of the type above set forth, the same having endless treads at each side thereof, which treads converge toward their upper runs, the ground engaging surfaces of said treads being constructed and arranged to be substantially horizontal when in ground engaging position.

It is also an object of this invention to provide a motor driven vehicle of the type above mentioned having endless tracks at each side thereof together with pneumatic means pushing downward on each track respectively to relatively move said frame and track to tilt said vehicle to maintain the same substantially upright.

It is also an object of this invention to provide a motor driven vehicle of the type above mentioned having a frame, pairs of wheels at its front and rear ends respectively, endless tracks running over said wheels at each side of said frame, a central endless track disposed between said tracks and normally disposed out of engagement with the ground and means for yieldingly supporting said last mentioned track.

It is also an object of the invention to provide a motor driven vehicle of the type above mentioned having a frame adapted to be straddled by an operator occupying a seat on said frame, said vehicle having means for controlling the same by the hands or feet of the operator.

These and other objects and advantages of the invention will be fully set forth in the following description made in connection with the accompanying drawings in which like reference characters refer to similar parts throughout the several views and in which—

Figure 8:
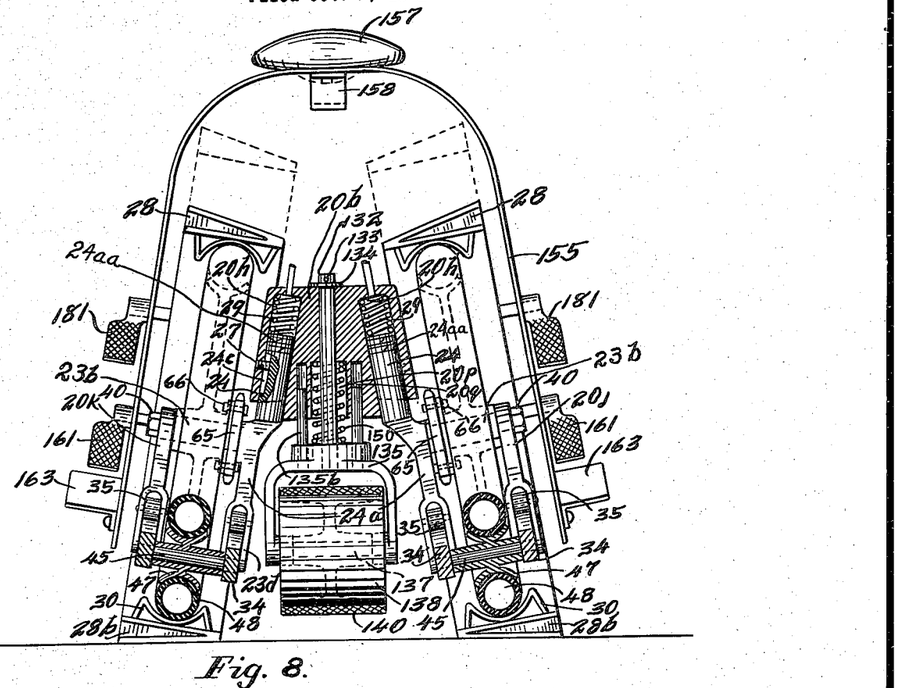
Fig. 8 is a vertical section taken on line 8—8 of Fig. 2 as indicated by the arrows.

Referring to the drawings, a motor propelled vehicle is shown comprising a frame designated generally as 20. Said frame comprises end castings 20a and 20b between which extend laterally spaced bars 20c. Castings 20a have longitudinally extending portions 20d through which extend headed and nutted bolts 21 extending through slots 20e in bars 20c so that said frame may be adjusted and lengthened or shortened. Each bar 20c has a laterally projecting lug 20f through which extends a headed limiting or stop screw 22 engaging casting 20a at its outer end. A lock nut 22a is disposed on screw 22 and engages the outer side of lug 20f. Each of the castings 20a and 20b has formed therein a pair of cylinders 20g and 20h respectively. These cylinders are spaced laterally and disposed equal distances at each side of the center of the machine. Plungers or pistons 23 and 24 are disposed respectively in cylinders 20g and 20h, the same preferably being provided with piston rings 24aa, two of which are shown. As shown in Fig. 8, screws 27 extend through the sides of cylinders 20g and 20h into grooves 24c in pistons 24 and similar grooves in pistons 23 so that the outer or downward movement of said pistons are limited thereby.

Figures 2, 3, 4, 5:
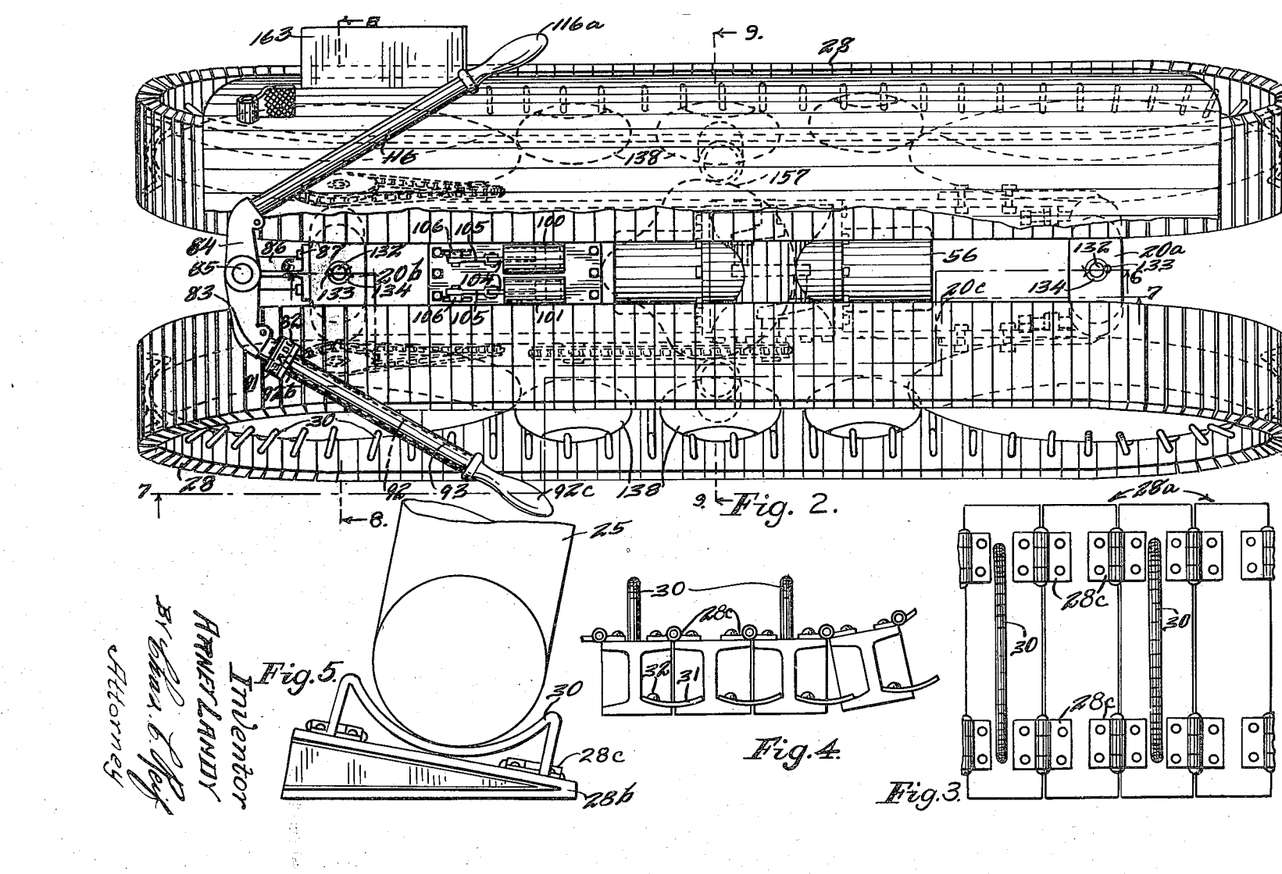
Fig. 2 is a plan view of the device.
Fig. 3 is a view of a portion of the tread or track used.
Fig. 4 is a view in side elevation of a portion of said track.
Fig. 5 is a view in end elevation of a portion of said track also showing part of the supporting wheel.
Figure 9:
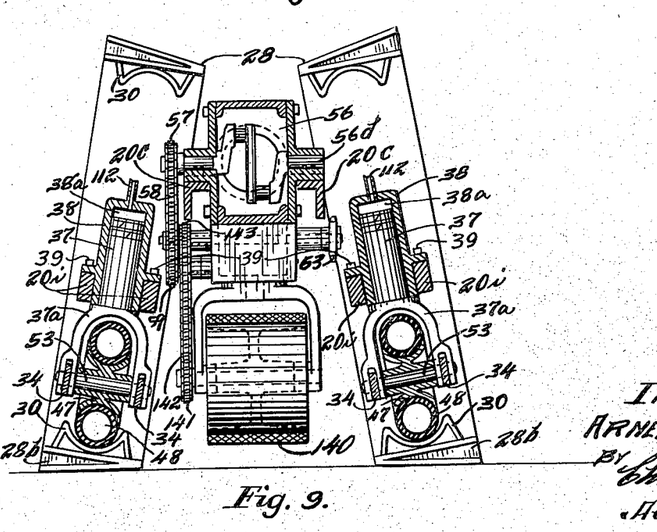
Fig. 9 is a vertical section taken on line 9—9 of Fig. 2 as indicated by the arrows.

Each of the plungers has a downwardly projecting extension 23a and 24a respectively which is of greater diameter than the plunger, the same forming a shoulder engaging the lower end of the adjacent cylinder 20g or 20h. Compression coiled springs 29 are disposed between the tops of plungers 23 and 24 and their respective cylinders 20g or 29h. Extensions 23a have secured thereto spindles 23b respectively and while these might be variously formed, in the embodiment of the invention illustrated they are shown as integral with extensions 23a. Wheels 25 are journaled on the spindles 23b, it being understood that there are four of said spindles, two at each end of frame 20. As shown in Figs. 8 and 9, the axes of cylinders 20g and 20h converge toward their upper ends. Spindles 23b thus are inclined outwardly and upwardly and wheels 25 converge toward their upper ends. Wheels 25 are provided with pneumatic tires 26 of any suitable or standard type. Running over the wheels 25 at each side of the frame are endless tracks 28. These tracks are composed of connected units 28a shown in Figs. 4 and 5 as of rectangular form in plan and being connected adjacent their ends by the hinges 28c. Alternate units 28a have the tire engaging members 30 shown as formed of rods having end portions extending perpendicular to the inner sides of units 28a and having intermediate portions formed on the arc of a circle somewhat larger than the outer circumference of the section of tire 26. While units 28a may be variously made in the embodiment of the invention illustrated they are shown as in the form of I beams (see Fig. 4), each having secured thereto a curved plate 31 which extends across the space between the units and fits against a curved surface on the flange of the adjacent unit. Units 28a are shown as of general V-shape in end elevation so that the lower surfaces 28b thereof are substantially horizontal in the lower run of tracks 28 as shown in Figs. 5, 8 and 9. The lower ends of projections 23a are formed as forks 23d and bars 34 fit between the sides of and fit longitudinally of said forks. Bearing rollers 35 carried on small shafts or pins 36 extending through the sides of forks 23d engage the top and bottom surfaces of said bars 34. Bars 34 are of slightly angular shape longitudinally and at their adjacent ends are pivotally connected to a projection 31a of a piston or plunger 37 disposed in a cylinder 38a formed in a member 38. Member 38 is secured by bolts 39 to the central portion of a bar 20i extending parallel to bar 20c. Bar 20i is connected at its ends to members 20j and 20k bored at their upper ends to receive the outer ends of spindles 23b, said spindles being provided with nuts 40 at the outer sides of bars 20i. Members 20j have projections 20m extending parallel to projections 20d and having slots receiving the ends of bars 20i. Headed and nutted bolts 41 extend through projections 20m and through slots 20n in bars 20i so that members 20j and bars 20i may be adjusted laterally and held in fixed relation. Bars 20i also have laterally projecting lugs at their ends through which extend headed stop screws 42, the outer ends of which engage members 20j, said screws being provided with lock nuts 43. The members 20j and 20k are also formed as forks at their lower ends and receive the ends of bars 34 which extend parallel to the bars 34 already described which are disposed in forks 23d. Members 20k also have the rollers 35 secured therein engaging the tops and bottoms of bars 34. It will thus be seen as clearly shown in Fig. 8 that there are pairs of bars 34 at each side of the machine. Shafts 45 are secured in and extend between these pairs of bars 34 and form the spindles for wheels 47, said wheels preferably being provided with pneumatic tires 48 and being disposed centrally of the tracks or treads 28. Projection 37a is in the form of a fork as shown in Fig. 9 and the lower ends of this fork are bifurcated to receive therein the adjacent ends of bars 34, said bars being pivoted to projections 37a by the pivot bolts 51. A shaft 53 extends through and between the sides of fork 37a and has journaled thereon another wheel 47 similar to the ones already described and which also bears on the center of the tracks or treads 28. It will be understood that there are two pairs of the bars 20i, the outer bar 20i extends between bars 20j and 20k and the inner bar 20i extends between members 23a. This is seen in Fig. 9.

Figure 6:
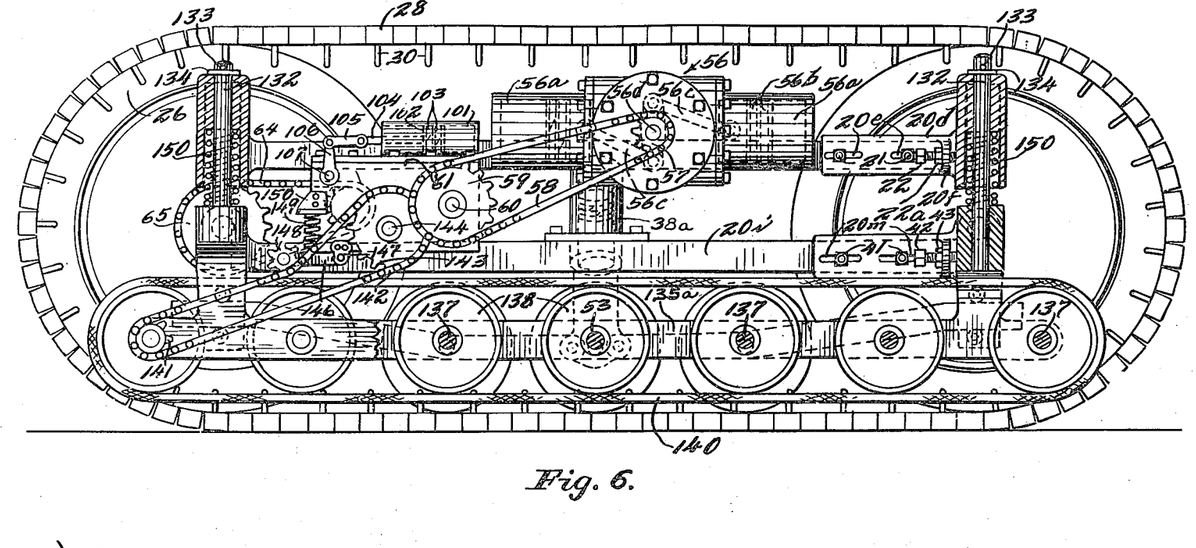
Fig. 6 is a vertical section taken substantially on line 6—6 of Fig. 2 as indicated by the arrows.

Supported upon members 20c of the frame is a motor 56. While this could be of any desired form it preferably and in practice has been a motor of the internal combustion type and is illustrated in Figs. 2 and 6 as having opposed cylinders 56a in which are disposed pistons 56b connected by the connecting rods 56c to a crank shaft 56d. Crank shaft 56d is provided at one side of the motor with a sprocket 57 over which runs a chain 58 also running over a sprocket 59 secured to a shaft 60 extending into a gear shift box 61 carried on the frame. The gear box 61 will be of the usual construction provided for automotive vehicles and will have gears providing for two or three forward speeds as desired. The transmission shaft 62 extending from the gear box 61 is provided with sprockets 63 and chains 64 run over these sprockets respectively and over sprocket 65 secured to the inner sides of wheels 25 by bolts 66, chains 64 thus driving treads 28. A main clutch such as commonly used in automobiles connects shaft 60 to a transmission shaft in gear box 61.

Figures 10, 11, 12:
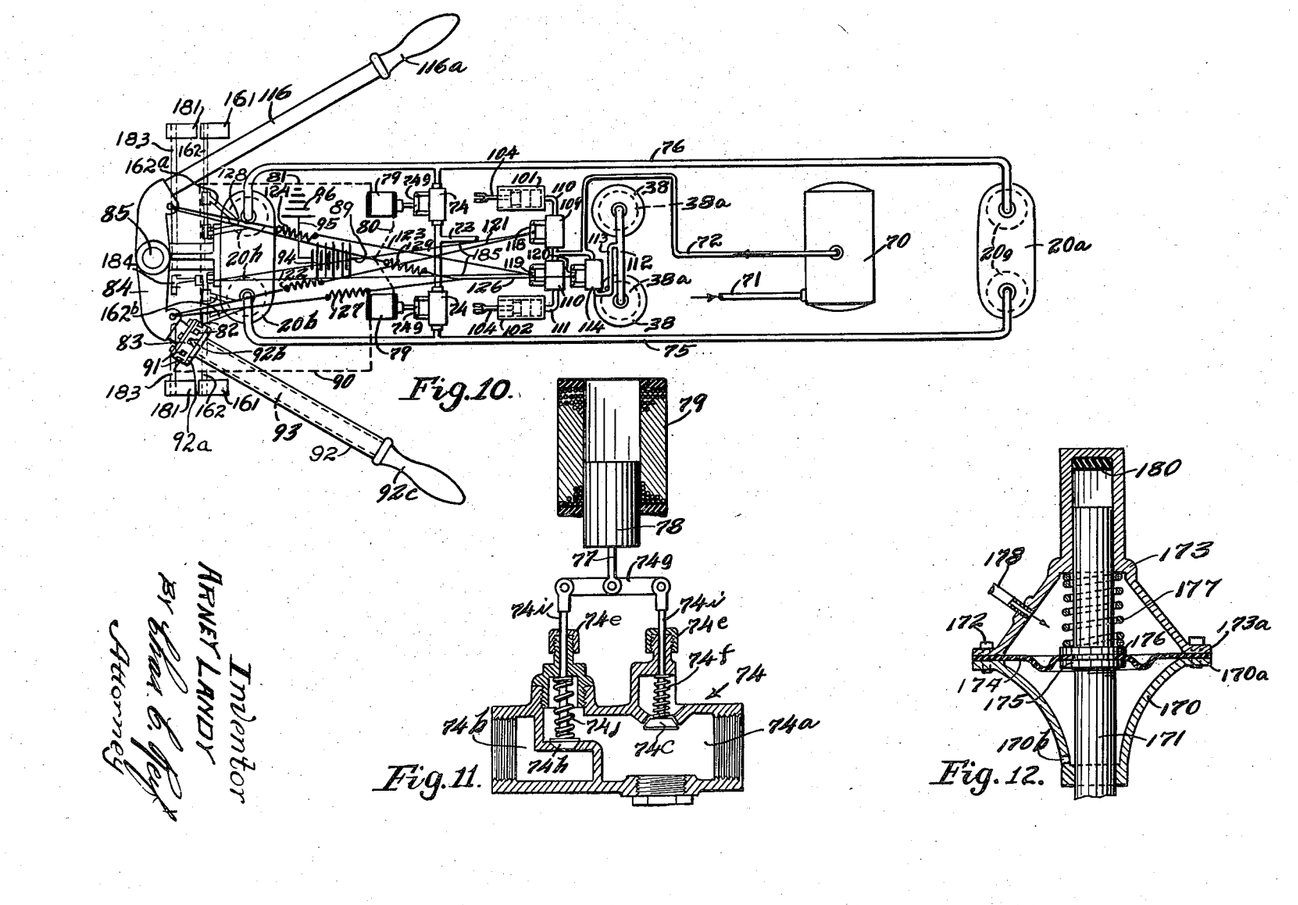
Fig. 10 is a somewhat diagrammatic plan view showing certain controls.
Fig. 11 is a vertical section through certain air control valves used.
Fig. 12 is a vertical section through a modified form of supporting and tilting means.

A compressed air tank 70 will be carried on the vehicle preferably at the rear of the frame and will be supplied with compressed air through a conduit 71 which will extend to an air compressor not shown which will also be carried on the frame and driven from motor 56. A supply pipe or conduit 72 leads from tank 70 and this will extend to a pipe 73 connected to one end of the air control valves 74. Each valve 74 has an inlet portion 74b and a delivery portion 74a. The delivery portion 74a is connected to the cylinders 20g and 20h at each side of the machine as shown in Fig. 10, conduits 75 and 76 extending respectively from the delivery sides of valves 74 to the said cylinders at each side of the machine as shown in Fig. 10. Chamber 74a of valve 74 has a port communicating with the atmosphere and closed by a valve 74c carried on a rod 74i and extending through a portion of valve 74 and through a suitable packing gland 74e. A compression coiled spring 74f acts to unseat valve 74c. Rod 74d is pivotally connected to one end of a cross bar or cross head 74g. Valve chamber 74b has a port communicating with chamber 74a which is closed by a valve 74h carried on a rod 74i extending through a portion of valve 74 and packing gland 74e. A compression coiled spring 74j acts to hold valve 74h normally closed. Rod 74i is pivotally connected to the other end of bar 74g. Bar 74g is pivotally connected at its central portion to a rod 77 in turn connected to the core 78 of an electro-magnet or solenoid 79. A conductor 80 is shown extending between the solenoids 79 and conductor 81 extends from one solenoid to spaced contacts 82 arranged circumferentially on a member 83 carried on an oscillating head 84 which is in turn mounted on a vertical shaft 85 secured in a bearing 86 (see Fig. 2). Bearing 86 is secured by bolts 87 to the front casting member 20b. Another conductor 90 extends from the other solenoid 79, being connected to the winding thereof to spaced contacts 91 also carried on member 83. Contact members 82 and 91 will be insulated from the frame. A member 92 is provided having an elongated sleeve rotatable on a shaft 93 secured to member 84. Member 92 has a flange 92a movable adjacent member 82 and having thereon a contact member or lug 92b. Member 92 is provided with a handle 92c by which it may be insulated about the axis of shaft 93. Member 92 will be electrically connected to the frame of the machine or to the ground. With the described construction it will be seen that when contact point 92b is brought into engagement with one of the contacts 82 that said contact and thus conductor 81 will be connected to the ground. This will close a circuit through the respective solenoid 79 which may be traced from ground 96 through conductor 95 to one side of battery 94, thence through conductor 89, conductor 80, the winding of solenoid 79, conductor 81, contact 82 and member 92 to ground. This will operate or energize the said solenoid 79 causing its core member 78 to move quickly therein. When member 92 is oscillated to bring its contact point 92b into engagement with one of the contact members 91, the other solenoid will likewise be energized. The circuit for this may be traced from ground 96 through conductor 95, battery 94, conductor 89, conductor 80 through the winding of the solenoid, conductor 90, contact 91 and member 92 to ground. Thus by oscillating the handle 92c the operator can energize either solenoid 79 at will. When core member 78 moved into its solenoid 79 rods 74d and 74i are moved toward the solenoid. This quickly closes valve 74c and then opens valve 74h. Air can now pass from pipe 73 to pipe 75 or pipe 76 into the cylinders 24g and 24h at one side of the machine depending upon which solenoid is energized. When air is admitted to these cylinders the plungers 23a and 23b are depressed or forced downwardly and this causes a rocking or tilting of the frame toward the other side of the machine. The connection between the end castings and the wheels on one side is in effect elongated and this causes the machine to rock about its support on the track at the other side or to be tilted. The purpose of this tilting is to maintain the balance of the machine when going over uneven ground or ground that is lower at one tread than the other. The machine is thus kept in upright position.

Carried on the frame and preferably disposed as shown on top of the gear box 61 are a pair of cylinders 100 and 101. Each cylinder contains a piston 102 which will preferably be provided with piston rings 103. The connecting rod 104 connects each piston respectively to links 105 which are in turn respectively connected to crank arms 106. Crank arms 106 are connected to shafts 107 extending into the gear box 61. The oscillation of crank arm 106 and shaft 107 will release a clutch connecting sprocket 63 to its drive shaft and will also apply a brake to said sprocket. This type of clutch and brake operated by a cam disk and crank is now well known in the art and is commonly used on certain automotive vehicles such as tractors or trucks. The details of such clutch and brake are not shown and it is thought need not further be described. The cylinders 101 and 102 are controlled by valves 109 and 110 connected thereto respectively by pipes 110 and 111. The cylinders 38a already described are supplied with air through pipes 112 shown in Fig. 10 as connected to the control valve 114 by a pipe 113. Pipe 72 is shown as supplying air to the valves 109, 110 and 114. As stated the member 84 is oscillatable about the vertical axis of shaft 85. A handle bar 116 is secured to the side of member 84 opposite to that to which members 92 and 93 are connected and member 116 is provided with a grip handle 116a. Grip handle 116a will be rotated and connected by the usual flexible shaft to the throttle of motor 56. Handle 116a thus forms an accelerator member for motor 56. Handles 92c and 116a are symmetrical in relation to the central line of the machine or the axis of shaft 85 and thus constitute handle bars in form something like those of the common bicycle or motorcycle. The valve members 109, 110 and 114 are similar to the valve members 74 already described and have their valve rods connected to bars 118, 119 and 120 respectively. Bar 118 has connected thereto a flexible member such as a wire or cable 121 and this is connected to member 84 at some distance from its pivot. A tensile coiled spring 122 is preferably disposed in cable 121. A cable 123 is connected centrally to bar 119 and this is connected to member 84 at the side of shaft 85 opposite to that to which cable 121 is connected. A tensile coiled spring 124 is preferably placed in cable 123. Another cable 126 is connected centrally to bar 120 and extends to member 84 and is connected thereto at the same point to which cable 121 is connected, a tensile coiled spring 127 being inserted in cable 126. Another cable 128 is connected to cable 126 some distance from bar 120 and extends to and is connected to member 84 at substantially the same point to which cable 123 is connected. A tensile coiled spring 129 is inserted in cable 128.

Figure 7:
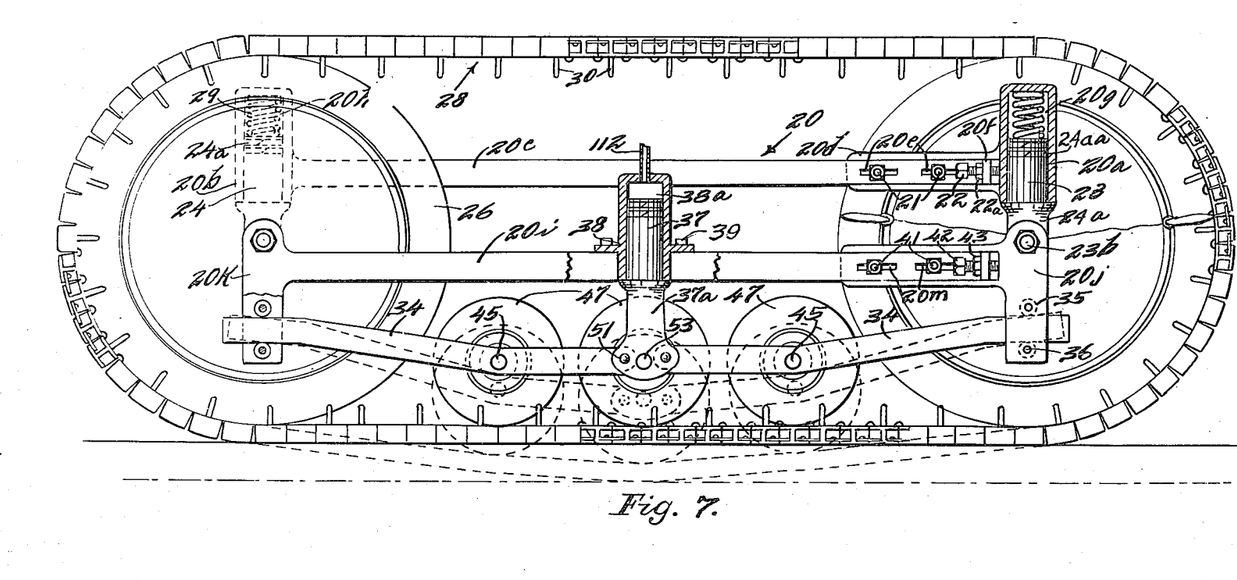
Fig. 7 is a vertical section taken substantially on line 7—7 of Fig. 2 as indicated by the arrows.

With the structure described it will be seen that if member 84 is oscillated in a clockwise direction cables 121 and 126 will be pulled upon and bars 118 and 120 will be moved outward. Cables 123 and 128 will be slacked so that no tension will be exerted by these cables. The bars 118, 119 and 120 are similar to bar 74g. When bars 118 and 120 are thus drawn outward air will be supplied to cylinder 101 and cylinders 38a. The pistons in these cylinders will thus be pushed outwardly. The crank arm 106 connected to the rod 104 of cylinder 101 will be oscillated and the drive to the wheel 25 on one side of the machine will be released or unclutched and a brake will be placed on the drive on said side. At the same time plungers 37 will be forced downwardly and the rollers 47 will be pushed downwardly against the tracks 28. When rollers 47 are thus pushed downwardly the effect is to raise the end portions of the tracks or to lessen the friction on the ground at the end portions. This is indicated in the dotted lines in Fig. 7. In practice a very decided effect is obtained. The wheels and track at one side of the machine are still being driven while the track at the other side is not being driven and is being retarded. The driven track then causes the machine to turn toward the undriven track. The turning is greatly facilitated by the downward motion of the wheels 47. The tracks are really supported only at the central portion thereof and turn with very little ground engagement. The machine thus quickly responds and a very short turn can be made. In fact the machine almost turns about a central vertical axis of one tread.

If the member 84 is oscillated in a counter clockwise direction cables 121 and 126 will be slacked but tension will be placed on cables 123 and 128. Cable 128 will thus pull on the rear portion of cable 126. Bars 119 and 120 will thus be pulled outwardly and air will be supplied to cylinder 102 and to the cylinders 38a. This will cause the track at the left hand side of the machine to be released and retarded while the track at the right hand side continues to be driven. The machine thus makes a turn to the left. By the use of the air cylinders the action is extremely rapid. The plungers are instantly pushed outwardly with the desired force and the turning or tilting of the machine is practically instantaneous.

The castings 20a and 20b are each provided centrally thereof with a bore 20p opening at the lower side thereof. A shaft 132 extends centrally through bore 20p and through said casting, the same projecting somewhat above the top of said casing and having a pin 133 therethrough adapted to engage a washer 134 on the top of the casting. Shaft 132 passes through washer 134. Shaft 132 is secured at its lower end to a fork member 135. Member 135 has a fork portion below each bore 20p and these are connected by elongated bars 135a extending between the sides of the fork. Shafts 137 are secured in and extend between bars 135a and have journaled thereon rollers 138. Suitable bearings will be provided for the rollers or wheels 138. An endless track 140 of any suitable or standard form extends around the rollers or wheels 138 as shown in Fig. 6. One shaft 137 preferably the end one, is provided with a sprocket 141 over which runs a chain 142 also running over a sprocket 143 secured to a shaft 144 projecting from the gear box 61. A lever arm 146 is pivotally connected at one end to a small bracket 147 secured to one of the bars 20i, which arm has mounted on its other end an idler sprocket 148 engaging the top run of chain 142. Lever arm 146 is engaged at its top side by compression coiled spring 149 also engaging the small flanged bracket 150 secured to the side of gear box 61. The sprocket 148 acts as a resilient tightening means for the chain 142. A spring 150 surrounds shaft 132 and is disposed in the bore 20p, the same engaging at its upper end with the top of said bore and engaging the top of member 135 at its lower end. Members 135 are thus resiliently supported on springs 150 when tread 140 is in contact with the ground. Member 135 has rods 135b secured thereto and projecting upward therefrom which fit in and slide respectively in bores 20q in castings 20a and 20b. Rods 135b act as guide rods for members 135.

Figure 1:
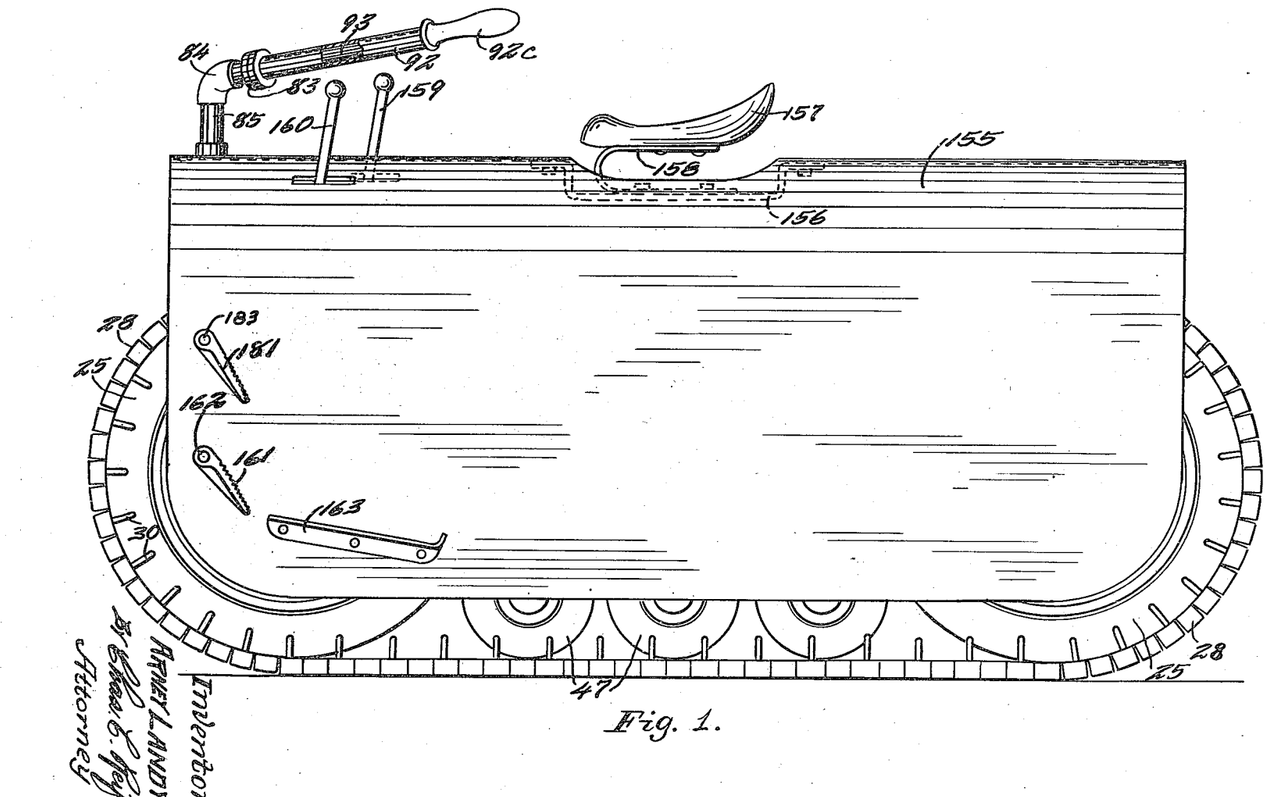
Fig. 1 is a view in side elevation of the device.

The frame, upper run of the tracks 28 and the major portion of wheels 25 are enclosed in a casing 155 as shown in Figs. 1 and 8. A bracket 156 of general U-shape is secured to the underside of casing 155 beneath an opening therein and an operator's seat 157 is secured to bracket 156 by a resilient bracket 158. Control levers 159 and 160 are shown as projecting through casing 155 in convenient position for manipulation of the operator occupying seat 157. One of the levers 159 will be a shift lever for giving the desired speed to the wheels 25 and treads 28, the other lever 160 may control the gear shift for putting into or out of operation shaft 144 and sprocket 143 which drive the tread 140 and for shifting gears for tread 140 to drive it at the desired speed. Tread 140 preferably should travel at the same linear speed as tracks 28.

Oscillating pedals 161 are provided at each side of the machine and are disposed at the outer side of casing 155. These are connected to shafts 162 and said shafts will have arms 162a and 162b thereon respectively to which will be connected cables. The arms 162a will be connected to cables 123 and 128 respectively, while the other arms 162b will be connected to cables 121 and 126 respectively. The operation of one pedal 161 will therefore be the same as swinging member 84 in one direction by the handle bars and the operation of the other pedal will be the same as swinging member 84 in the other direction by the handle bars. The operator can thus control the steering by foot pedals 161 and can remove his hands from the handle bars. He may wish to do this to use his hands to operate a gun.

Another pair of oscillating pedals 181 are provided at each side of the machine and at the outer side of casing 155 secured to shafts 183. One of these shafts 183, preferably the one at the right hand side of the machine, will have connected thereto through arm 184 cables 185 which will run over suitable pulleys (not shown) and be connected to the members 118 and 119 so as to operate them simultaneously. This will operate valves 109 and 110, releasing the clutches in the transmission box or gear box 61 and applying the brakes therein to both driving shafts for the treads. Both treads will therefore be retarded or braked and the machine will be quickly stopped. It will be noted that this is done without operating valve 114 to depress the treads. The pedal 181 at the left will be actuated to operate or release the main clutch on shaft 60 so that this shaft and sprocket 59 are disconnected from the motor to permit shifting of gears by the gear shift lever 159. This is the usual arrangement in an automobile of releasing the clutch to shift the gears. Foot rests 163 are provided at each side of the casing 155 as shown in Figs. 1 and 8.

In Fig. 12 a modified form of structure is shown which could be used to replace the cylinders 20g and 20h. The frame will have secured thereto or made integral therewith a member 170 and the fork or lower wheel-carrying portion 23 will have its upper end formed as a shaft or spindle 171. Member 170 has a flange 170a secured by screws 172 to the mating flange 173a of a member 173, a flexible diaphragm 174 being disposed between flanges 170a and 173a and secured by bolts 172. Member 173 has a cylindrical portion at its upper end bored to receive and guide the upper end of spindle 171, which spindle also passes through a bore in the lower end of member 170. Spindle 171 is provided with a collar 175 and the central part of the diaphragm 174 is held between collar 175 and another collar 176 secured on spindle 171. A compression coiled spring 177 surrounds spindle 171 above collar 176 and engages a shoulder at the upper end of the chamber in member 173. An air supply pipe 178 communicates with the chamber in member 173 above diaphragm 174. Some resilient means such as the block 180 made of rubber or similar material will be disposed in the bore in the upper end of member 173. A vent opening 170b extends into the chamber in member 170 below diaphragm 174.

With the described construction the frame will be supported on spring 177 which will transmit the load thereof through spindle 171 to the wheels 25 and tracks 28. When it is desired to tilt the frame or exert pressure downwardly on spindle 171 air will be admitted to the chamber in member 173 just as it is admitted to the cylinders 20g and 20h. Diaphragm 174 will be depressed as will spindle 171. This will react to tilt the frame 20 laterally. Should spindle 171 move to the upper end of the bore in member 173 it would be cushioned by block 180.

From the above description it will be seen that I have provided a highly novel and useful motor driven vehicle. The vehicle is designed to run on rough ground and on ground where there are no well made trails or roads. The wheels 25 and treads 28 will be driven at the desired speeds. Ordinarily only the treads 28 will be used to drive the vehicle. If soft ground should be encountered so that the treads 28 sink into the ground sufficiently the track or tread 140 will engage the ground. This may then be driven at the desired speed through sprocket 143 and the chain 142 and this tread will assist in the propulsion of the vehicle. While the vehicle will have many uses, it will obviously be of great benefit and have a great utility as a military vehicle. It could be used for quick transportation across country and it could also be used as a type of one man tank. Tandem seats could be used if desired, one being for an operator and the other for a gunner. The casing 155 could be used as an armor plate. A gun could easily be mounted on the forward part of the vehicle to be manipulated by the operator. The type of tread used running on pneumatic tires is very feasible. The wheels 25 and treads 28 were given the upwardly converging position to provide ease in steering. It is much easier to steer the vehicle with the treads and wheels so arranged. As above described, the machine can be steered either from the handle bars having handles 92c and 116a or it can be steered from pedals 161. It can also be quickly stopped by operating one of the pedals 181. The device is thus under the complete control of the operator and it can be driven at fairly high speeds across very rough country. The device has been amply demonstrated in actual practice and found to be very successful.

It will of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A motor propelled vehicle having in combination, a longitudinally rigid frame constructed and arranged to be straddled by the operator, a motor on said frame, pairs of wheels rotatably mounted in the front and rear of said frame respectively, endless tracks running over said front and rear wheels one at each side of said frame, a seat on said frame between said pairs of wheels so arranged that the operator occupying the same straddles said frame and upper runs of said tracks, means for driving one of said pairs of wheels from said motor and steering controls in front of said seat adapted to be grasped by the operator operatively connected to said tracks respectively for steering said vehicle.

2. A motor propelled vehicle having in combination, a frame constructed and arranged to be straddled by the operator, a motor on said frame, pairs of laterally spaced wheels at the front and rear of said frame respectively, endless tracks running over said front and rear wheels one at each side of said frame, a seat on said frame between said pairs of wheels so arranged that the operator straddles said frame and the upper runs of said tracks, foot rests at each side of said frame forwardly of said seat arranged to be engaged by the respective feet of the operator, means for driving one of said pairs of wheels from said motor and steering controls in front of said seat adapted to be grasped by the operator for acting on said tracks for steering said vehicle.

3. A motor propelled vehicle having in combination, a frame constructed and arranged to be straddled by the operator, a motor on said frame, pairs of laterally spaced wheels at the front and rear of said frame respectively, endless tracks running over said front and rear wheels one at each side of said frame, a seat on said frame between said pairs of wheels so arranged that the operator straddles said frame in the upper runs of said track, brake levers at each side of said frame forwardly of said seat adapted to be engaged by the feet of the operator respectively, means for driving one of said pairs of wheels from said motor and steering controls in front of said seat adapted to be grasped by the operator acting on said tracks for steering said vehicle.

4. A motor propelled vehicle having in combination, a frame constructed and arranged to be straddled by the operator, a motor on said frame, pairs of wheels at the front and rear of said frame respectively, endless tracks running over said front and rear wheels one at each side of said frame, a casing enclosing said frame, the upper runs of said treads and the major portion of said wheels, a seat disposed between said pairs of wheels and above said casing, said casing being constructed and arranged to be straddled by the operator occupying said seat, members at each side of said casing adapted to be engaged by the feet of the operator respectively and steering controls in front of said seat adapted to be grasped by the operator and acting on said tracks for steering said vehicle.

5. A motor propelled vehicle having in combination, a frame constructed and arranged to be straddled by the operator, a motor on said frame, pairs of wheels at the front and rear of said frame respectively, endless tracks running over said front and rear wheels one at each side of said frame, said wheels of each pair being inclined upwardly and inwardly toward said frame, means for driving one of said pairs of wheels from said motor and means for steering said vehicle.

6. The structure set forth in claim 5, said treads having ground engaging surfaces which are horizontal in the lower runs of said treads.

7. A motor propelled vehicle having in combination, a frame constructed and arranged to be straddled by the operator, a motor on said frame, pairs of wheels at the front and rear of said frame respectively, endless tracks running over said front and rear wheels one at each side of said frame, the upper runs of which are in such proximity as to be straddled by the operator, means for driving one of said pairs of wheels from said motor for progressing said tracks and vehicle and means for tilting said frame laterally in either direction at the will of the operator for maintaining the balance of said vehicle and keeping it in upright position.

8. A motor propelled vehicle having in combination, a frame constructed and arranged to be straddled by the operator, a motor on said frame, pairs of laterally spaced wheels at the front and rear of said frame respectively, endless tracks running over said front and rear wheels one at each side of said frame, the upper runs of said tracks being in such proximity as to be straddled by the operator, means for driving one of said pairs of wheels from said motor and progressing said tracks and means for pressing down on said tread at either side of said frame for relatively moving said frame and tilting the same.

9. A motor propelled vehicle having in combination, a frame constructed and arranged to be straddled by the operator, a motor on said frame, pairs of wheels at the front and rear of said frame respectively, endless tracks running over said front and rear wheels, one at each side of said frame, a seat above said tracks mounted on said frame for said driver, the upper runs of said tracks being arranged to be straddled by the driver occupying said seat, means for driving one of said pairs of wheels from said motor for progressing said tracks and means for braking the wheels at one side of said frame to facilitate turning of said vehicle.

10. A motor propelled vehicle having in combination, a frame constructed and arranged to be straddled by the operator, a motor on said frame, pairs of wheels at the front and rear of said frame respectively, endless tracks running over said front and rear wheels, one at each side of said frame, means for driving one of said pairs of wheels from said motor for progressing said tracks and an endless track disposed between said tracks with the bottom of its lower run being disposed some distance above the bottom of the lower runs of said first mentioned tracks.

11. The structure set forth in claim 10 and means for yieldingly supporting said last mentioned tread at the end portions thereof.

12. A motor propelled vehicle having in combination, a frame constructed and arranged to be straddled by the operator, a motor on said frame, pairs of wheels at the front and rear of said frame respectively, endless tracks running over said front and rear wheels, one at each side of said frame, means for driving one of said pairs of wheels from said motor for progressing said tracks, an endless track disposed between said tracks with the bottom of its lower run being disposed some distance above the bottom of the lower runs of said first mentioned treads and means for driving said last mentioned track from said motor.

13. A motor propelled vehicle having in combination, a frame constructed and arranged to be straddled by the operator, a motor on said frame, pairs of laterally spaced wheels at the rear and front of said frame respectively, endless tracks running over said front and rear wheels, one at each side of said frame, means for yieldingly supporting said frame at each end from said tracks and fluid actuated means disposed at the ends of said frame for causing relative movement between said wheels at one side of said vehicle and said frame.

14. The structure set forth in claim 13 and a control member in front of the operator adapted to be manipulated by the operator for actuating said last mentioned means.

15. A motor propelled vehicle having in combination, a frame, a motor on said frame, pairs of wheels at the front and rear of said frame respectively, endless tracks running over said front and rear wheels, one at each side of said frame, cylinders at each side of said frame at the front and rear thereof, plungers in said cylinders connected to said wheels and tracks and fluid actuated means for depressing said plungers at either side of said frame for tilting said frame in either direction to balance said vehicle and maintain it in vertical position.

16. The structure set forth in claim 15 and a control member in front of the operator adapted to be manipulated by the operator for actuating said last mentioned means.

17. A motor propelled vehicle having in combination, a frame, said frame having a pair of cylinders therein at its front and rear ends, pistons in said cylinders, axles carried by said pistons at one side thereof, wheels journalled on said axles, means for directing fluid into said cylinders at one side of said frame to cause said frame to rock about the wheels at the other side of said vehicle the pistons in the cylinders at the other side of said frame being maintained in normal position.

18. The structure set forth in claim 17, the axes of said cylinders extending downwardly and outwardly at each side of said frame.

19. A motor propelled vehicle having in combination, a frame, said frame having a pair of cylinders therein at its front and rear ends respectively, pistons in said cylinders having extensions therein, axles carried by said extensions, wheels journalled on said axles, endless tracks extending over the wheels at each side of said frame respectively and means for supplying fluid to said cylinders at one side of said frame to move said pistons in said cylinders to cause relative movement between said frame and axles at one side of said frame while maintaining said pistons at the other side of said frame stationary to rock said frame about the wheels at said other side.

20. A motor propelled vehicle having in combination, a frame constructed and arranged to be straddled by the operator, a motor on said frame, pairs of laterally spaced wheels at the front and rear of said frame respectively, endless tracks running over said front and rear wheels at each side of said frame, the upper runs of which are in such proximity as to be straddled by the operator, means for driving one of said pairs of wheels from said motor for progressing said tracks and vehicle and means for lengthening the distance between said wheels and frame at one side of said frame to rock said frame.

21. A motor propelled vehicle having in combination, a frame constructed and arranged to be straddled by the operator, a pair of laterally spaced wheels at the front and rear of said vehicle, axles on which said wheels are journalled, endless tracks extending around the wheels at each side of said vehicle, members carrying said axles having pistons thereon, said frame having laterally spaced cylinders at the front and rear thereof in which said pistons are movable and means for depressing the pistons at one side of said vehicle to rock said frame about the bottoms of said wheels at the other side of the vehicle while maintaining said pistons at the other side of said vehicle stationary.

ARNEY LANDY.